United States Patent
Alvarez Tabio Togores et al.

(10) Patent No.: US 10,809,067 B2
(45) Date of Patent: Oct. 20, 2020

(54) DYNAMIC TRAFFIC RENDERING

(71) Applicant: HERE Global B.V., Eindhoven (NL)

(72) Inventors: Pedro Alvarez Tabio Togores, Chicago, IL (US); Sunil Kumar Chintakindi, Naperville, IL (US); Andrew Calkins, Chicago, IL (US); Joy Hoeffler, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 127 days.

(21) Appl. No.: 15/653,666

(22) Filed: Jul. 19, 2017

(65) Prior Publication Data

US 2017/0322034 A1  Nov. 9, 2017

Related U.S. Application Data

(63) Continuation of application No. 14/259,903, filed on Apr. 23, 2014, now Pat. No. 9,739,619.

(51) Int. Cl.
*G01C 21/26* (2006.01)
*G01C 21/32* (2006.01)
*G09B 29/10* (2006.01)
*G06T 11/20* (2006.01)

(52) U.S. Cl.
CPC ............ *G01C 21/26* (2013.01); *G01C 21/32* (2013.01); *G06T 11/203* (2013.01); *G09B 29/10* (2013.01); *G09B 29/106* (2013.01)

(58) Field of Classification Search
CPC ....... G01C 21/26; G01C 21/32; G06T 11/203; G09B 29/10; G09B 29/106
See application file for complete search history.

(56) References Cited

U.S. PATENT DOCUMENTS

| | | | |
|---|---|---|---|
| 6,226,646 B1 | 5/2001 | Geurts | |
| 6,393,358 B1 | 5/2002 | Erzberger et al. | |
| 6,466,862 B1 | 10/2002 | DeKock et al. | |
| 7,248,841 B2 | 7/2007 | Agee et al. | |
| 8,060,496 B2 * | 11/2011 | Hessling | G01C 21/32 |
| | | | 707/722 |
| 8,650,004 B2 | 2/2014 | Carrasco et al. | |
| 2004/0095907 A1 | 5/2004 | Agee et al. | |

(Continued)

FOREIGN PATENT DOCUMENTS

EP   0579451   1/1994

OTHER PUBLICATIONS

International Search Report and Written Opinion cited in PCT/IB2015/052883, dated Aug. 11, 2015.

(Continued)

*Primary Examiner* — Thomas E Worden
(74) *Attorney, Agent, or Firm* — Lempia Summerfield Katz LLC

(57) ABSTRACT

An initial geometry including one dimensional representation of a path is accessed. The initial geometry may be based on traffic data. An envelope size is identified based on the path. The envelope size may be derived from a width, functional classification, or lane quantity associated with the path. A processor calculates a supplemental geometry based on the envelope size for the path and generates a two dimensional representation of the path based on the initial geometry, the supplemental geometry, and the envelope size.

20 Claims, 10 Drawing Sheets

(56) References Cited

U.S. PATENT DOCUMENTS

| | | | |
|---|---|---|---|
| 2007/0273555 A1* | 11/2007 | Amano | G01C 21/3694 340/935 |
| 2007/0294023 A1 | 12/2007 | Arcot et al. | |
| 2008/0262715 A1 | 10/2008 | Geelen et al. | |
| 2009/0299626 A1* | 12/2009 | Denaro | G01C 21/26 701/533 |
| 2010/0204814 A1 | 8/2010 | Neumaier et al. | |
| 2010/0317365 A1 | 12/2010 | William et al. | |
| 2011/0071801 A1 | 3/2011 | Carrasco et al. | |
| 2011/0118966 A1 | 5/2011 | Finnis et al. | |
| 2011/0298637 A1* | 12/2011 | Posner | H04H 20/55 340/905 |
| 2012/0306923 A1 | 12/2012 | Boschker et al. | |
| 2013/0030692 A1* | 1/2013 | Hagan | G01C 21/32 701/410 |
| 2013/0110472 A1* | 5/2013 | Chan | E01C 1/02 703/1 |
| 2013/0328861 A1* | 12/2013 | Arikan | G06T 11/20 345/419 |
| 2013/0339891 A1 | 12/2013 | Blumenberg et al. | |
| 2014/0032184 A1 | 1/2014 | Carrasco et al. | |
| 2015/0193562 A1 | 7/2015 | Chan et al. | |
| 2015/0379163 A1 | 12/2015 | Wang | |
| 2017/0008521 A1* | 1/2017 | Braunstein | G01C 21/165 |

OTHER PUBLICATIONS

Quang, Integrate Traffic Data with IBM Intelligent Transportation Using a Traffic Data Gateway, Jul. 15, 2011, ibm.com/developerworks/websphere/library/techarticles/ind-inteltrans/.

Suna TPEG Traffic Services, 2011, intelmatics.com.au/wp-content/uploads/Click-here-for-Suna-TPEG-Traffic-Services-Product-Description.pdf.

European Office Action for European Patent Application No. 15 724 058.1-1003 dated Nov. 7, 2019.

* cited by examiner

150

| FUNCTIONAL CLASS | ENVELOPE FACTOR |
|---|---|
| 1 | 2.00 |
| 2 | 1.75 |
| 3 | 1.50 |
| 4 | 1.25 |
| 5 | 1.00 |

| FUNCTIONAL CLASS | NUMBER OF LANES | ENVELOPE SIZE (microdegrees) |
|---|---|---|
| 1 | 8 | 100 |
| 1 | 6 | 80 |
| 1 | 4 | 70 |
| 2 | 4 | 60 |
| 2 | 2 | 50 |
| 3 | 2 | 45 |
| 3 | 1 | 35 |

FIG. 6B

DYNAMIC TRAFFIC RENDERING

CROSS-REFERENCE TO RELATED APPLICATIONS

This application is a continuation under 37 C.F.R. § 1.53(b) and 35 U.S.C. § 120 of U.S. patent application Ser. No. 14/259,903 filed Apr. 23, 2014, which is incorporated by reference in its entirety.

FIELD

The following disclosure relates to the designation of traffic lanes for a multi-lane path in traffic data, or more particularly, a two dimensional designation of traffic lanes based on a one dimensional path from traffic data.

BACKGROUND

Traffic technology is the study of movement of vehicles on the roads. Analytical techniques may manage and track traffic information and derive travel times, guide driving behavior and optimize road infrastructure for cities.

Traffic Message Channel (TMC) and other traffic services deliver traffic information to customers. Traffic incidents and traffic flow are reported through broadcasts. Traffic delays may be caused by one or more of congestion, construction, accidents, special events (e.g., concerts, sporting events, festivals), weather conditions (e.g., rain, snow, tornado), and so on.

In some areas, broadcast messages contain reports of traffic and road condition information. These systems broadcast the traffic data over traffic message channels on a continuous, periodic, or frequently occurring basis. Traffic message receivers decode the data and provide user friendly reports of traffic and road conditions.

In addition, traffic information may be overlaid on maps and encoding schemes that illustrate different traffic levels on the map. However, TMC and other traffic services broadcast data that does not directly overlay with the path location of the maps.

SUMMARY

An initial geometry including one dimensional representation of a path is accessed. The initial geometry may be based traffic data. An envelope size is identified based on the path. The envelope size may be derived from a width, functional classification, or lane quantity associated with the path. A processor calculates a supplemental geometry based on the envelope size for the path and generates a two dimensional representation of the path based on the initial geometry, the supplemental geometry, and the envelope size.

BRIEF DESCRIPTION OF THE DRAWINGS

Exemplary embodiments of the present invention are described herein with reference to the following drawings.

FIGS. 6A and 6B illustrates example tables for envelope sizes.

DETAILED DESCRIPTION

One significant technical challenge for software applications for traffic data visualizations is to is to render a full traffic flow map that is customizable to multiple types of traffic data feed formats. Location reference information, either through TMC (Traffic Messaging Channel) or other traffic services, may be included in many such traffic data feed formats. Data rendering techniques, such as portable network graphics (PNG) map tiles with integrated traffic or transparent PNG traffic overlays on top of the map, may not always be available for all traffic feed formats.

The following embodiments address these shortcomings using a dynamic approach to render traffic flow information on maps based on vectorial geometry compatible with many different platforms. This approach relies on one or more of two key traffic visualization features. First, path geometries are generated from a baseline traffic feed, instead of directly relying on a traditional map rendering service. Second, an envelope algorithm for bidirectional roads is applied. The resulting geometries may be associated with speed values or jam factors.

Figure 1:
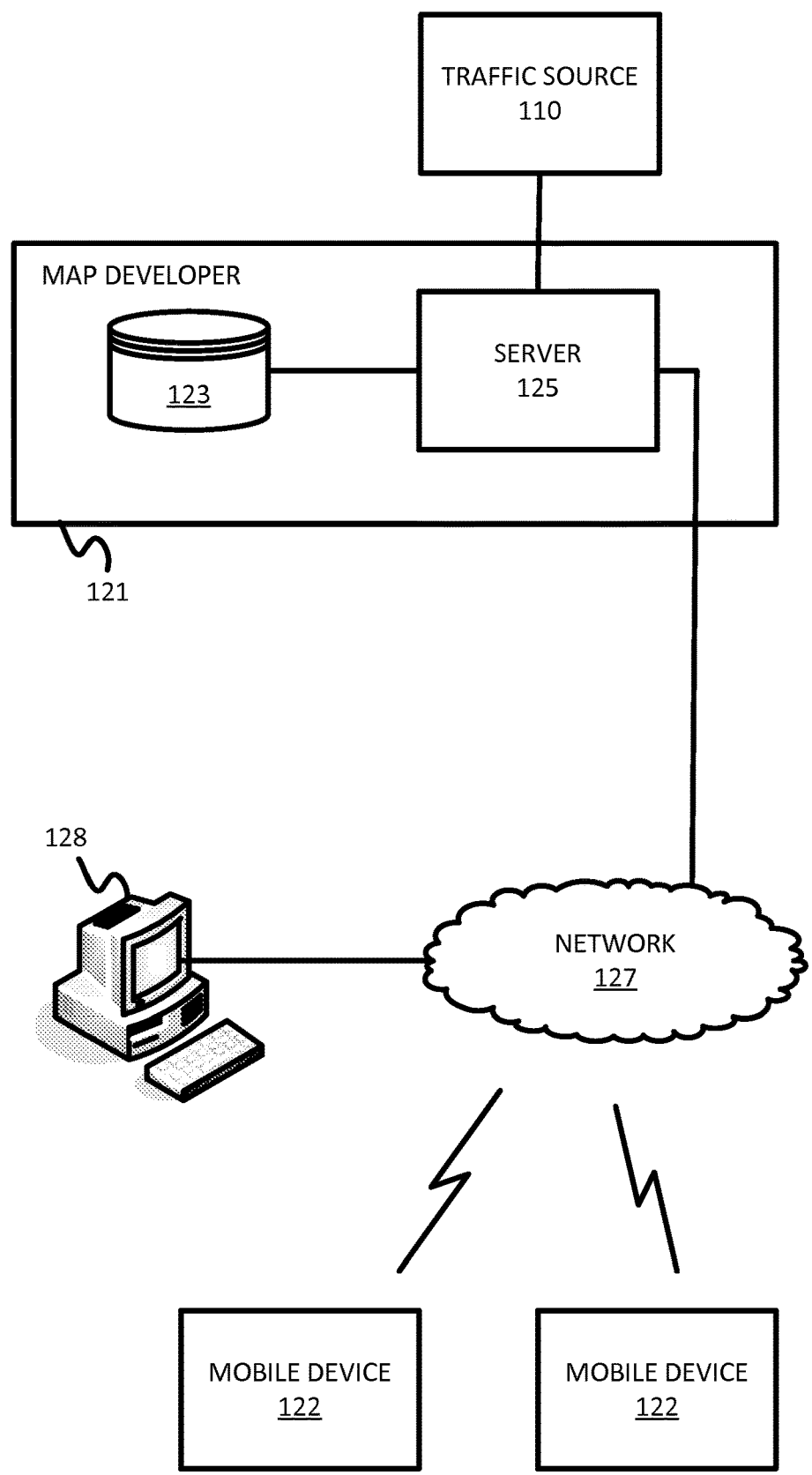
FIG. 1 illustrates an example system for dynamic traffic rendering.

FIG. 1 illustrates an example system 120 for dynamic traffic rendering. The system 120 includes a developer system 121, one or more mobile devices 122, a workstation 128, and a network 127. The system 120 may receive a flow of traffic data from a traffic service 110. Additional, different, or fewer components may be provided. For example, many mobile devices 122 and/or workstations 128 connect with the network 127. The developer system 121 includes a server 125 and a database 123. The developer system 121 may include computer systems and networks of a system operator.

The traffic service 110 may send traffic data to the map developer or directly to mobile devices 122. The traffic service 110 may be in TMC format and broadcast over a predetermined radio frequency or other wireless signals. The traffic data may include locations codes associated with event data or incident data. Any format of traffic data including location codes may be used.

The server 125 receives user location data. The user location data may be received from one of the mobile device 122, in which case the location corresponds to a location of the mobile device 122 as determined by position circuitry such as a global positioning system (GPS). The location data may be received from workstation 128 as a location entered into a map application. In another embodiment, the location data is selected systematically across a geographic area to dynamically render traffic representations of all available traffic data in the geographic area.

The server 125 is configured to access an initial geometry including one dimensional representation of a path. For example, the initial geometry may be a path segment that corresponds to the location. The path segment may be selected from the database 123 (e.g., the closest path in the database 123 to the location). The path segment may be a portion of route selected by the mobile device 122 or the workstation 128.

The server 125 is configured to identify an envelope size associated with the path segment. The path segment may be associated with an identifier in the database 123. The identifier may include an alphanumeric code indicative of the functional classification of the path or the number of lanes of the path. The path segment may be a constant value for all types of segments. In one example, the envelope size may be variable according to the type of segment. In another example, the envelope size may be variable according to the number of lanes in the path segment. In another example, the envelope size may be variable according to the relative distance to other path segments near the location.

The server 125 is configured to calculate a supplemental geometry based on the envelope size for the path. The supplemental geometry may be spaced from the initial geometry by the envelope distance. The supplemental geometry may be parallel to the initial geometry. The server 125 is configured to generate a two dimensional representation of the path based on the initial geometry, the supplemental geometry, and the envelope size.

The mobile device 122 is a smart phone, a mobile phone, a personal digital assistant ("PDA"), a tablet computer, a notebook computer, a personal navigation device ("PND"), a portable navigation device, and/or any other known or later developed portable or mobile computing device. The mobile device 122 includes one or more detectors or sensors as a positioning system built or embedded into or within the interior of the mobile device 122. The mobile device 122 receives location data for geographic position from the positioning system.

The optional workstation 128 is a general purpose computer including programming specialized for the following embodiments. For example, the workstation 128 may receive user inputs for the envelope sizes for particular path segments or classifications of path segments. The workstation 128 may receive user inputs for manually defining the speed ranges for the color, shading, or alphanumeric labels for traffic designations of the path segment.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components. The computing resources may be divided between the server 125 and the mobile device 122. In some embodiments, the server 125 performs a majority of the processing. In other embodiments, the mobile device 122 or the workstation 128 performs a majority of the processing. In another example, the processing is divided substantially evenly between the server 125 and the mobile device 122 or workstation 128.

Figure 2:
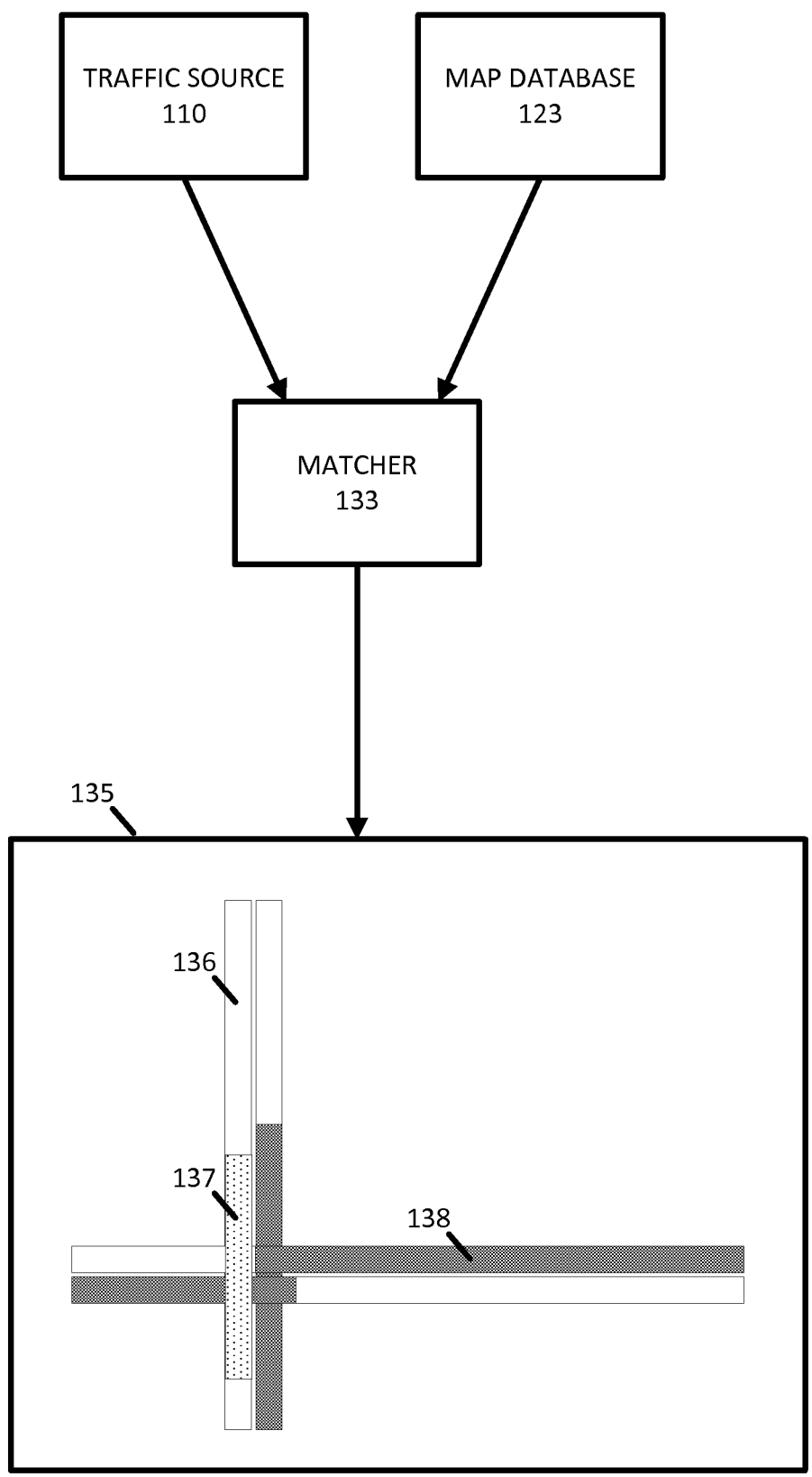
FIG. 2 illustrates example matching system for traffic rendering.

FIG. 2 illustrates example matching system for traffic rendering. The matching system receives data from the traffic source 110 and the map developer 123. A matcher 133, which may be an independent device or an application executed by the server 125, combines traffic data received from the traffic source 110 and map geometries received from the map developer 121 to dynamically render traffic geometries.

The matcher 133 may include a parser or parsing algorithm that is configured to parse or digest traffic feeds from the traffic source 110. The matcher 133 may match location codes in the traffic data from the traffic source 110 with locations in the map database 123. The locations from the map database may be selected in real time, or near real time, based on the location data received from a particular mobile device 122.

The parsing algorithm may identify a primary TMC data and sub-TMC data from the traffic feed. The sub-TMC data may describe offset distances in order to apply different traffic values to a path assigned to a single TMC location code. The offset location may divide the path segment be in the longitudinal direction of the path segment (e.g., with traffic) into multiple sections. The offset location splits the path segment into sections, which may be encoded with independent congestion levels and illustrated as having different congestion levels. For example, the sections of the path segment may be illustrated in different colors or shadings on a map.

The parsing algorithm may also distinguish between internal identification values and external identification values. Internal identification values are those related with the parts of a TMC that belong to elements such as ramps, exits and incorporations to a highway. On the other hand, external identification values are those used for regular road segments. For that reason, the geometry of a TMC includes an internal section as well as an external one, and it is required to retrieve both to perform an adequate envelope calculation. Internal and external may have the same ID number, but differ on the direction symbol. While external identification values have +/−, internal identification values have P/N, respectively for positive and negative directions.

As discussed in more detail below, an envelope algorithm is applied to paths to generate geometries and for the matched traffic data. The geometries may be stored in a fast, in-memory cache for generalized, traffic service agnostic traffic flow data. This data may then be made available through a RESTful application programming interface (API) to any client side application. A client side application may apply the data through any specialized implementation, which may be based on polyline rendering.

Map 135 illustrates an example implementation in which locations codes from the traffic source 110 defined in a single dimension have been converted into multi-lane paths dynamically rendered for traffic maps. The map includes two two-lane paths with varying traffic designations. The paths include light traffic areas 136, moderate traffic areas 137, and high traffic areas 138.

Figure 3A:
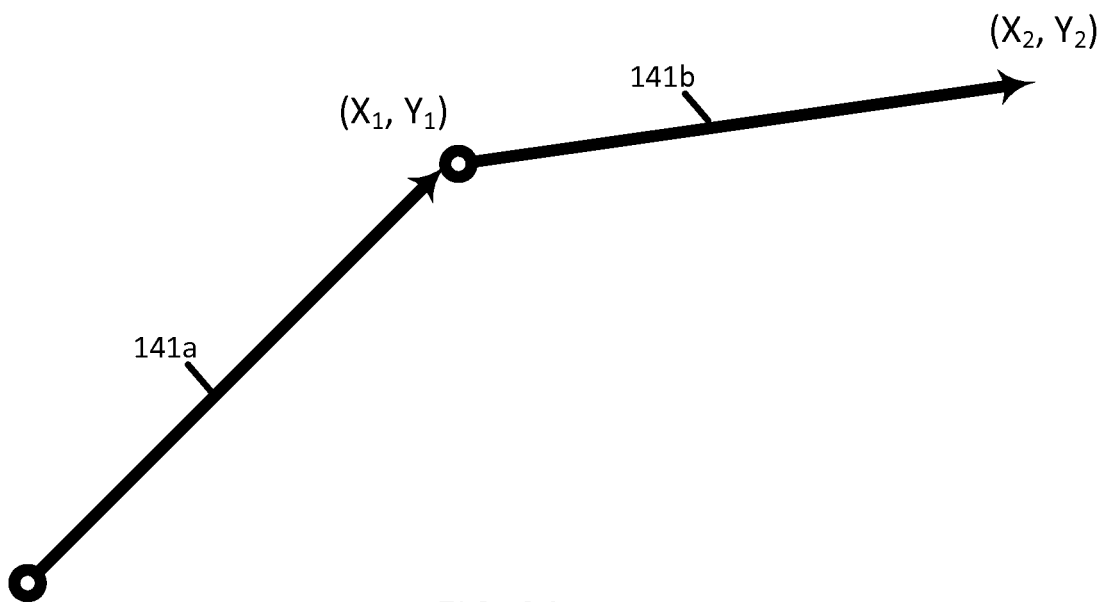
FIG. 3A illustrates an example of one dimensional path geometry.

FIG. 3A illustrates an example of one dimensional path geometry made of multiple path segments 141a-b. Each path segment may be a vector defined by a location code or pair of location codes (e.g., from traffic service 110). For example, path segment 141a may be defined as a vector from an origin to location code $(X_1, Y_1)$, path segment 141b may be defined by a vector from location code $(X_1, Y_1)$ to location code $(X_2, Y_2)$.

Figure 3B:
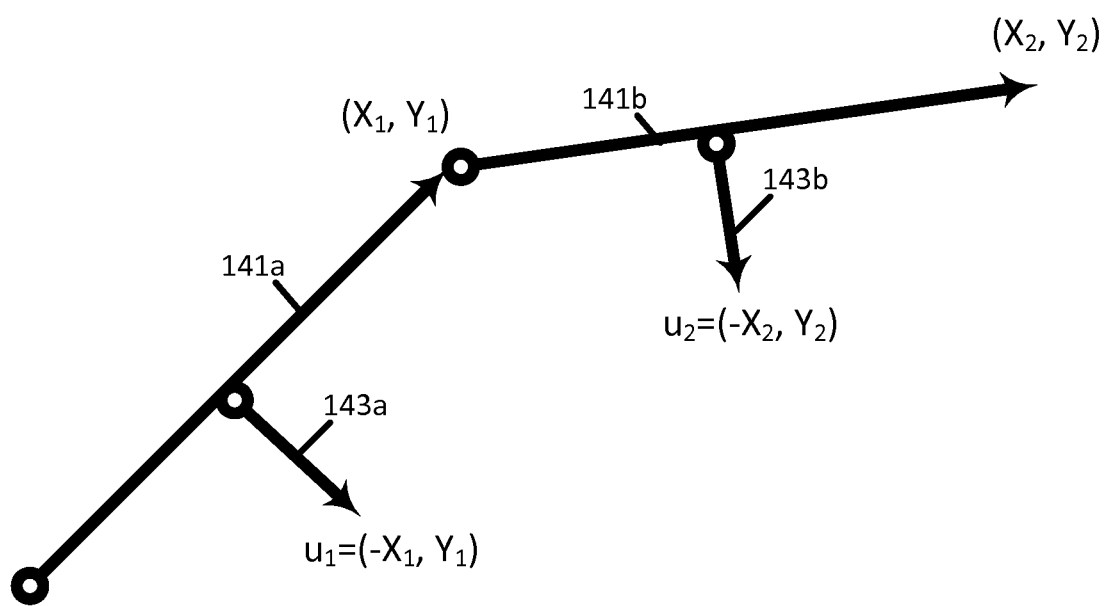
FIG. 3B illustrates the one dimensional path geometry of FIG. 3A and envelope vectors.

FIG. 3B illustrates the one dimensional path geometry of FIG. 3A and envelope vectors 143a-b. The envelope vectors may be perpendicular or normal to the respective path segments 141a-b. The envelope vector $u_1$ is defined by path segment 141a and the envelope vector $u_2$ is defined by path segment 141b.

The direction of the envelope vectors 143a-b may depend on the local driving norms. In areas where driving occurs on the right hand side of the road, which may be referred to as right hand traffic (RHT) locations, the envelope vector may be 90 degrees to the right or clockwise from the direction of the original vector of the path segment. In RHT locations, when the original direction vector is defined as (latitude value, longitude value), the envelope vector may be defined as (−longitude value, latitude value). Thus, the envelope 143a is shown in the direction of (−$X_1$, $Y_1$) and the envelope vector 143b is shown in the direction of (−$X_2$, $Y_2$).

In areas where driving occurs on the left hand side of the road, which may be referred to as left hand traffic (LHT) locations, the envelope vector may be 90 degrees to the left or counterclockwise from the direction of the original vector of the path segment. Thus, in LHT locations, when the original direction vector is defined as (latitude value, longitude value), the envelope vector may be defined as (longitude value, −latitude value). Thus, the envelope vector 143a is shown in the direction of (−$X_1$, $Y_1$).

The server 125 may receive location data from the mobile device 122 and access a country database, which may be included in database 123, in order to determine if the current location of the mobile device is a LHT location or a RHT location. Most countries of the world are RHT locations, and notable examples of LHT locations include the United Kingdom, Australia, South Africa, Ireland, and India.

The envelope vectors 143a-b may be normalized to have unit length of 1 and describe direction only. Equation 1 describes the normalization of a vector $\vec{n}$ = (latitude, longitude):

$$\vec{n_{unit}} = \frac{\vec{n}}{\sqrt{n_{lat}^2 + n_{lon}^2}} \qquad \text{Eq. 1}$$

Figure 4A:
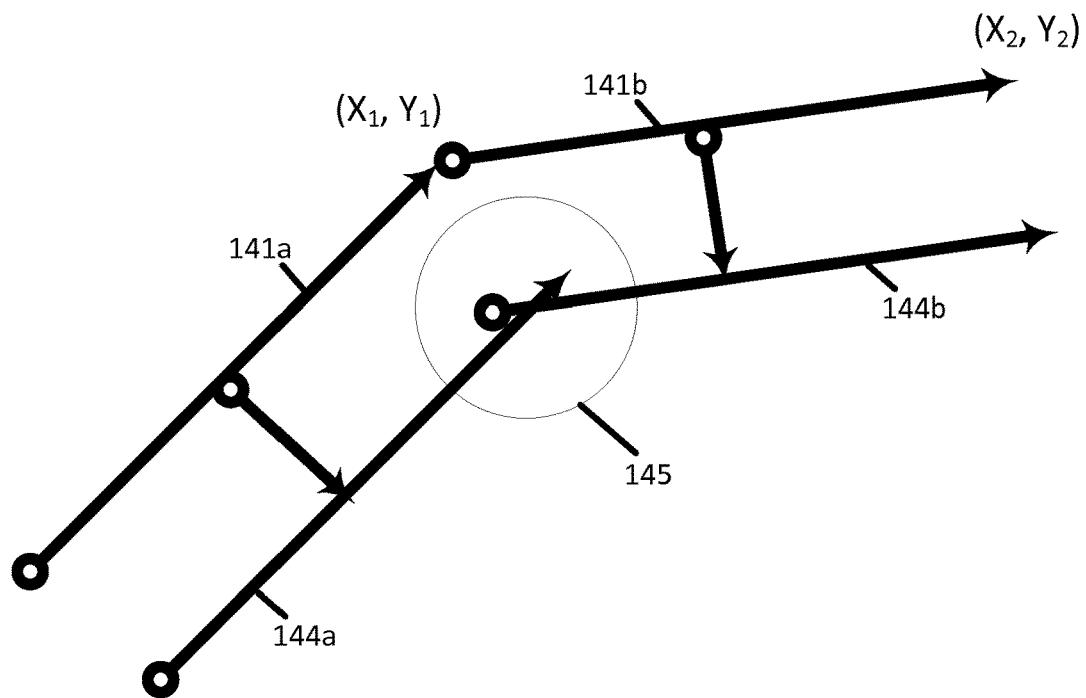
FIG. 4A illustrates supplemental path geometries based on the envelope vectors of FIG. 3B.

FIG. 4A illustrates supplemental path geometries 144a-b based on the envelope vectors of FIG. 3B. A supplemental path geometry is calculated based on a geometric translation of the original path segments 141a-b. The direction of the translation is defined by envelope vectors 143a-b, and the magnitude of the translation is defined by an envelope distance. The envelope distance may be constant or variable. Variable envelope distances may be user selectable or defined based on a characteristic of the original path segment.

As shown in region 145, the vectors for the supplemental path geometries 144a-b do not meet at the endpoints. In other words, the head one vector for one path segment does not align with the tail of the vector from the downstream path segment. This phenomenon may be referred to as an open shape. The server 125 is configured to convert the original path segments 141a-b and supplemental path geometries 144a-b from an open shape to a closed shape.

Figure 4B:
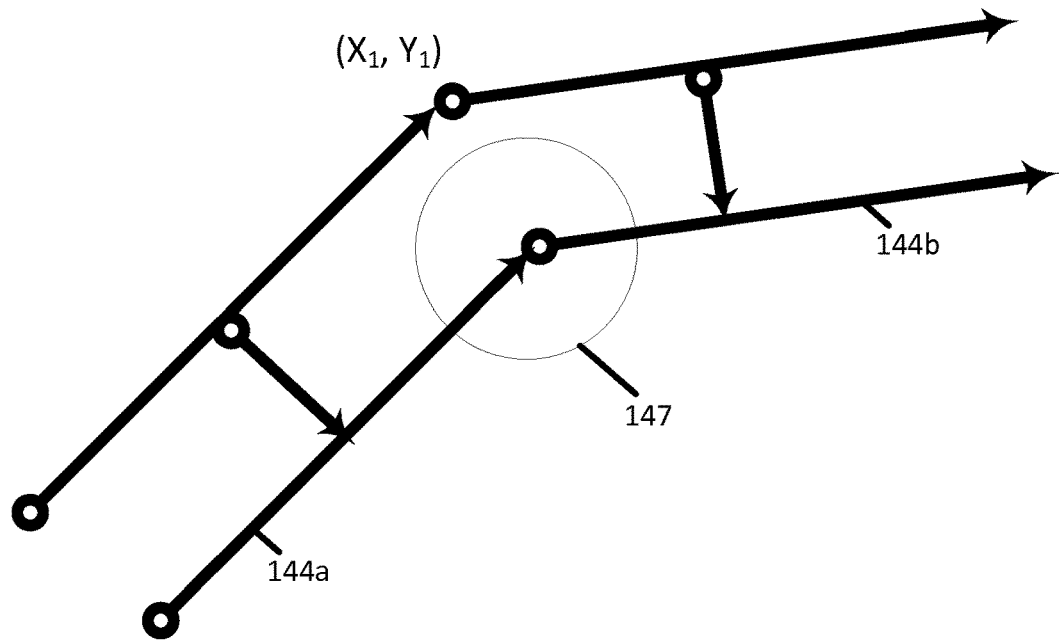
FIG. 4B illustrates a modified path geometry based on the supplemental path geometries of FIG. 4A.

FIG. 4B illustrates a modified path geometry based on the supplemental path geometries of FIG. 4A. In one example, the upstream vector is shortened and the downstream vector is elongated until the two vectors meet at a single point. This may be achieved through calculating the intersection point of the two vectors or the two supplemental path geometries 144a-b. The following pseudocode describes an algorithm for this process:

If first and last points are not the same (open shape) then
    Insert first point in final geometry
    For each pair of lines, calculate intersection
    Insert last point in final geometry
Else
    For each pair of lines, calculate intersection
    Calculate intersection for last and first line to close the shape The supplemental path geometries 144a-b may be defined algebraically according to Equation 2 based on one intersection with an axis ($C_{lat}$, $C_{lon}$) and a direction vector (v).

$$(\text{lat,lon}) = kv + (C_{lat}, C_{lon}) \qquad \text{Eq. 2}$$

Each of the supplemental path geometries 144a-b, if extended, intersects with at least one axis. Path geometries that are parallel to an axis would not interest that axis, but would intersect the other axis, and most path geometries, if extended, would intersect both axes. Using linear algebra, Equations 3 and 4 describe the intersection of the supplemental path geometry of Equation 2. Equation 3 is derived by setting $C_{lon}=0$ as the point where the vector intersects the latitude axis. Equation 4 is derived by setting $C_{lat}=0$ as the point where the vector intersects the longitude axis. The coordinates ($p_{lat}$, $p_{lon}$) is known point (e.g., $X_1$, $Y_1$ or $X_2$, $Y_2$ as shown in FIGS. 4A-B).

$$\begin{bmatrix} p_{lat} \\ p_{lon} \end{bmatrix} = \begin{bmatrix} 1 & -v_{lat} \\ 0 & -v_{lon} \end{bmatrix} * \begin{bmatrix} c_{lat} \\ k \end{bmatrix} \qquad \text{Eq. 3}$$

$$\begin{bmatrix} p_{lat} \\ p_{lon} \end{bmatrix} = \begin{bmatrix} 0 & -v_{lat} \\ 1 & -v_{lon} \end{bmatrix} * \begin{bmatrix} k \\ c_{lon} \end{bmatrix} \qquad \text{Eq. 4}$$

Equation 3 and/or equation 4 may be applied to each of the supplemental path geometries 144a-b to create a system of equations shown in matrix format by Equation 5. It should be noted that only one of Equation 3 and 4 is needed. The server 125 may selection one of Equation 3 and 4 and switch to the other equation if no solution exists (e.g., when the path segment is parallel to the latitude axis or the longitude axis).

$$\begin{bmatrix} c_{2lat} - c_{1lat} \\ c_{2lon} - c_{1lon} \end{bmatrix} = \begin{bmatrix} v_{1lat} & -v_{2lat} \\ c_{1lon} & -v_{2lon} \end{bmatrix} * \begin{bmatrix} k_1 \\ k_2 \end{bmatrix} \qquad \text{Eq. 5}$$

Figure 5:
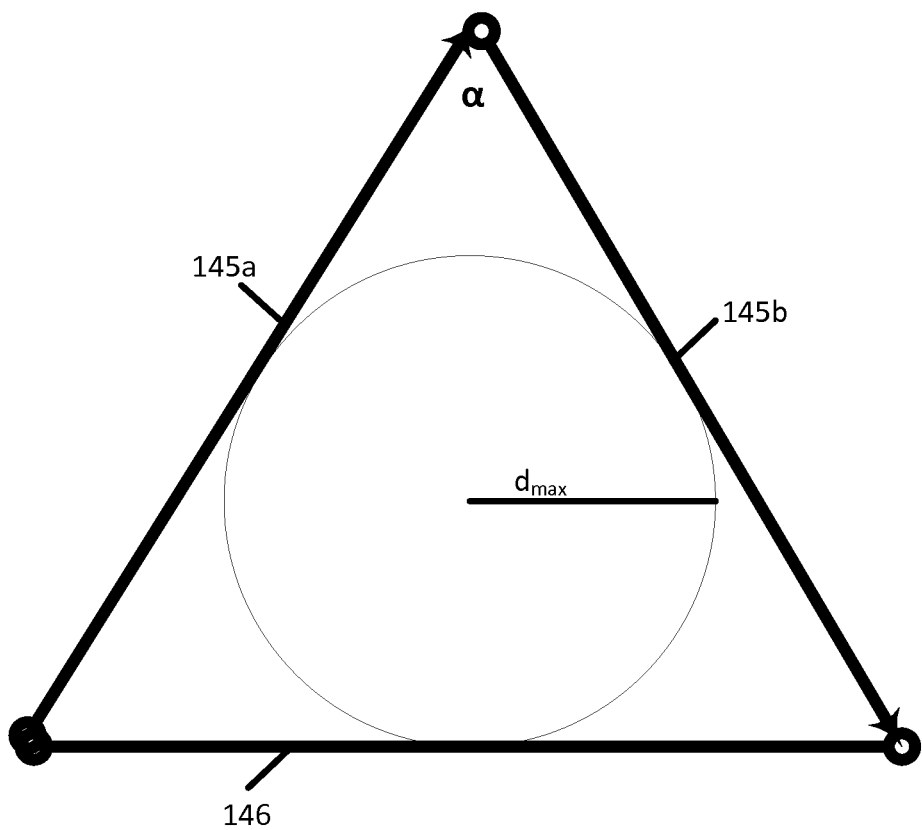
FIG. 5 illustrates a maximum path geometry angle.

FIG. 5 illustrates a maximum path geometry angle that may limit the envelope sizes available when creating the supplemental path geometries. The original path segments meet at a turn angle that corresponds to a turn in the path when traveling from the upstream path segment to the downstream path segment. For a path that continues substantially in a straight line, the original path segments are substantially parallel, and the turn angle is 0 degrees, or within a range of 0 degrees. Examples ranges include 0.5 degrees and 1 degrees.

When the turn angle is less than 90 degrees, the envelope size may be limited by a maximum envelope size $d_{max}$. Consider two original path segments 145a-b that meet an angle α, shown by FIG. 5. The maximum envelope size $d_{max}$ may be defined according to the lengths of path segments 145a-b and the length of a closing segment 146 that forms a triangle with path segments 145a-b. The maximum envelope size $d_{max}$ may be defined according to a radius of an incircle formed by the triangle. Equations 6 and 7 define the maximum envelope size $d_{max}$ as a function of a length (a) of an upstream path segment (e.g., path segment 145a), a length (b) of a downstream path segment (e.g., path segment 145b), and a length (c) of a closing segment.

$$d_{max} = \sqrt{\frac{(s-a)(s-b)(s-c)}{s}} \qquad \text{Eq. 6}$$

-continued $$s = \frac{1}{2}(a+b+c) \quad \text{Eq. 7}$$

The server 125 may compare the envelope size to the maximum envelope size. When the envelope size is less than the maximum envelope size, the server 125 proceeds to calculate the supplemental geometries as described above, and modify the supplemental path geometries. The path geometries may be reduced in size to terminate at the intersection point as solved from Equations 2-5.

However, if the envelope size is equal or greater than the maximum envelope size, the server 125 may calculate a substitution segment for one or a combination of both supplemental path geometries, or for the original path geometries. In one example, the server 125 may calculate the closing segment 146 that forms a triangle with path segments 145*a-b*. The envelope vector may be applied to closing segment 146 and the path segments 145*a-b* may be omitted FIGS. 6A and 6B illustrates example lookup tables for envelope sizes. The server 125 may identify the functional class of the path segment from data included in the database 123. The server 125 may assign an envelope size to the path segment based on the functional classification. The server 125 may identify a number of lanes for the path segment from the database 123. The server 125 may assign an envelope size to the path segment based on the number of lanes. The server 125 may assign an envelope size to the path segment based on a combination of the functional class and the number of lanes.

The envelope size may include a default size. The default size may be defined in terms of a geographic distance, a scale distance on a map, or a display distance on the mobile device 122. Example default sizes defined by geographic distance include 20, 35.3, 50, or 100 microdegrees. If a circumference of the Earth is divided into 360 degrees or 3600 seconds, a microdegree (μdeg) is a unit of angle measurement equal to $10^{-6}$ degrees, or 3.6 milliarcseconds.

The table 150 of FIG. 6A illustrates a correlation between functional class and envelope factor. The envelope factor is multiplied by the default size to calculate the envelope size for a particular road segment.

The table 155 of FIG. 6B illustrates a correlation between functional class and the number of lanes to calculate an envelope size. It should be noted when two path segments in the same functional class have different numbers of lanes, the path segment with the larger number of lanes has a greater envelope size. It should also be noted than when two path segments have the same number of lanes but are different functional classes, the path segment in the lower numbered (higher priority) functional class, has a greater envelope size. Other assignments for the envelope size are possible.

Table 1 lists example classification systems that may be assigned numeric values for functional class as shown in FIGS. 6A and 6B.

TABLE 1

| Simple System | Complex System | U.S. Long Distance Roads | Highway Tags |
| --- | --- | --- | --- |
| Arterial Road | Interstates | Interstate Expressway | Motorway |
| Collector Road | Principal Arteries | Federal Highway | Trunk |
| Local Road | Minor Arteries | State Highway | Primary |
| | Major Collector | County Highway | Secondary |
| | Minor Collector | Local Road | Tertiary |
| | Local Road | | Residential |

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size.

Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

Alternatively, the database 123 may list road width or lane quantities. The server 125 may access the database for the road width according to the geographic location reported by the mobile device 122. The road width may be used as an initial value of the target route.

Figure 7:
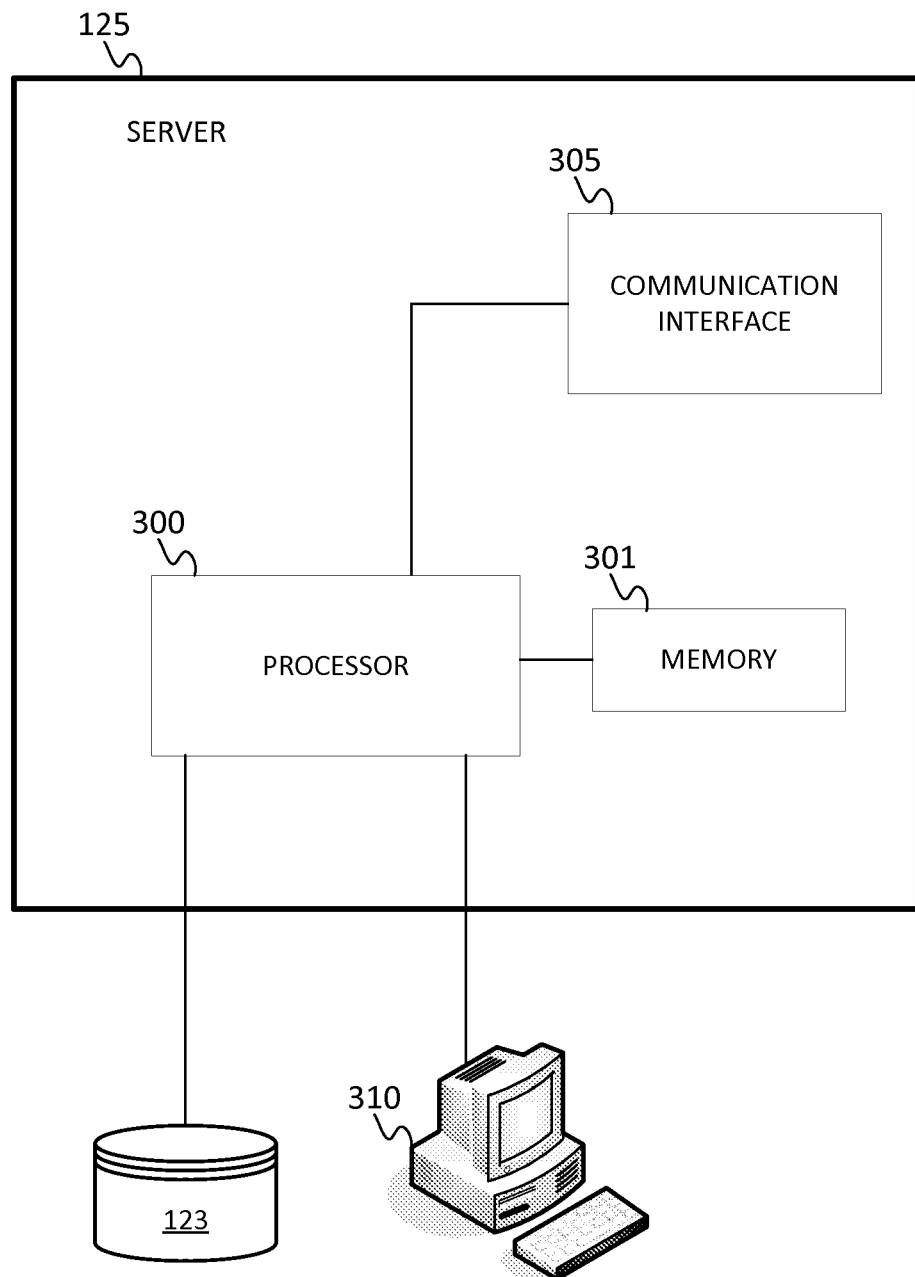
FIG. 7 illustrates an exemplary server of the system of FIG. 1.
Figure 8:
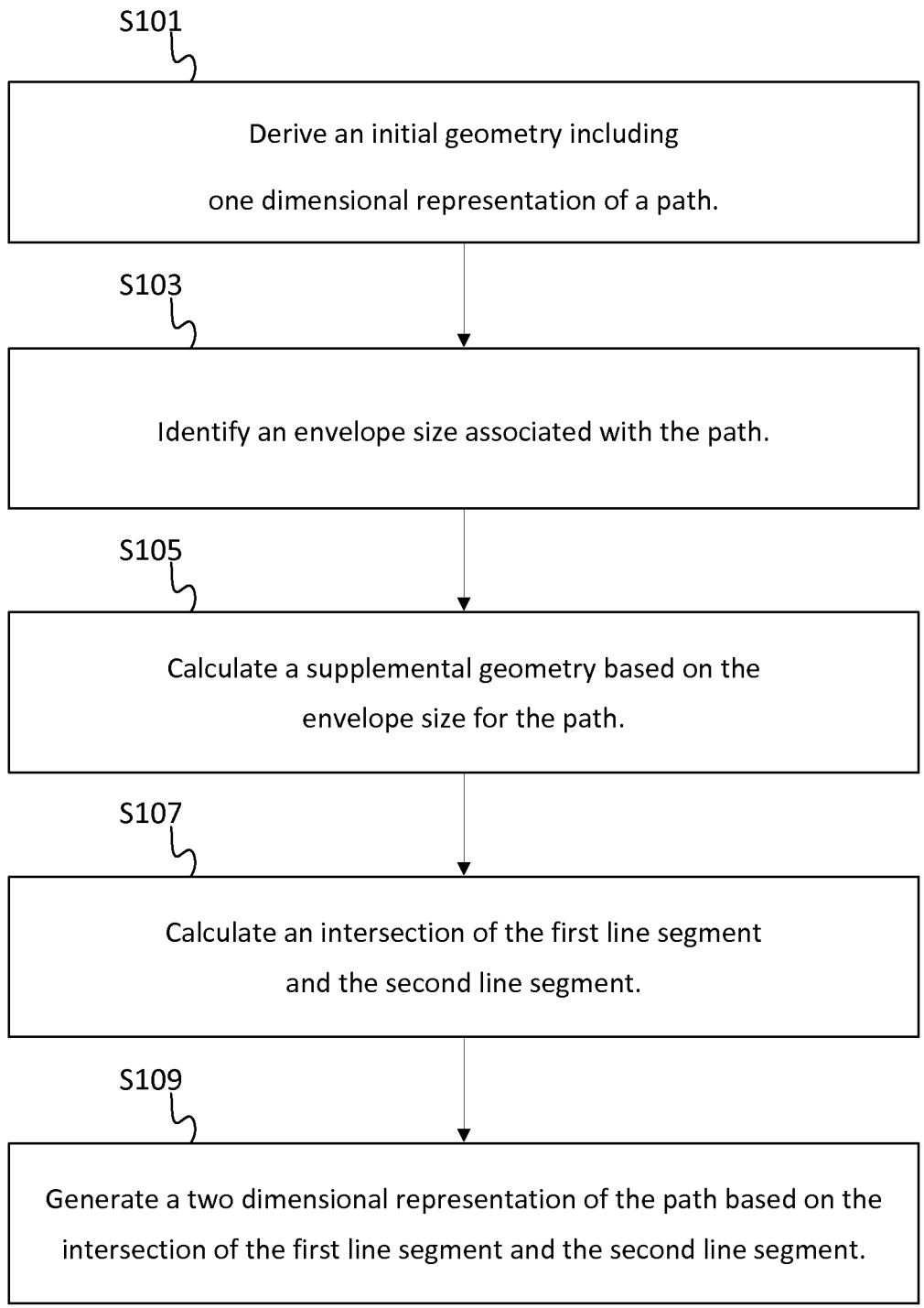
FIG. 8 illustrates example flowchart for traffic rendering.

FIG. 7 illustrates an exemplary server 125 of the system of FIG. 1. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122. Additional, different, or fewer components may be included. FIG. 8 illustrates an example flowchart for dynamic traffic rendering. The acts of FIG. 8 may be performed by the server 125 or another device. Additional, different, or fewer acts may be provided.

At act S101, the processor 300 derives an initial geometry including one dimensional representation of a path. The initial geometry may include multiple segments or a single segment. The initial geometry may be received through communication interface 305 from workstation 310 or another external device. The initial geometry may be derived from location codes received from a traffic service or from TMC data. For example, the initial geometry may be a one dimensional line drawn from one location code to a subsequent location code.

At act S103, the processor 300 identifies an envelope size associated with the path. The envelope size may be determined by querying database 123 using the location codes from the traffic service. The database 123 may associate segments in the map data with identifiers that describe functional classifications, path width, lane quantities, or other values indicative of the envelope size of the paths.

At act S105, the processor 300 calculates a supplemental geometry based on the envelope size for the path. The supplemental geometry may include a portion that corresponds to each segments of the initial geometry. The supplemental geometry may be multiple lines parallel to the initial geometry and spaced from the initial geometry by the envelope size.

At act S107, the processor 300 calculates an intersection of the multiple lines of the supplemental geometry. The processor 300 may sole the intersection using geometry or linear algebra. The algebraic method may include a matrix derived from the lines of the supplemental geometry.

At act S109, the processor 300 generates a two dimensional representation of the path based on the intersection of the first line segment and the second line segment. In one example, the processor 300 may modify one or more lengths of the lines making up the supplemental geometry based on the intersection. The line of the supplemental geometry may be shortened until the lines each terminate at a single point.

Figure 9:
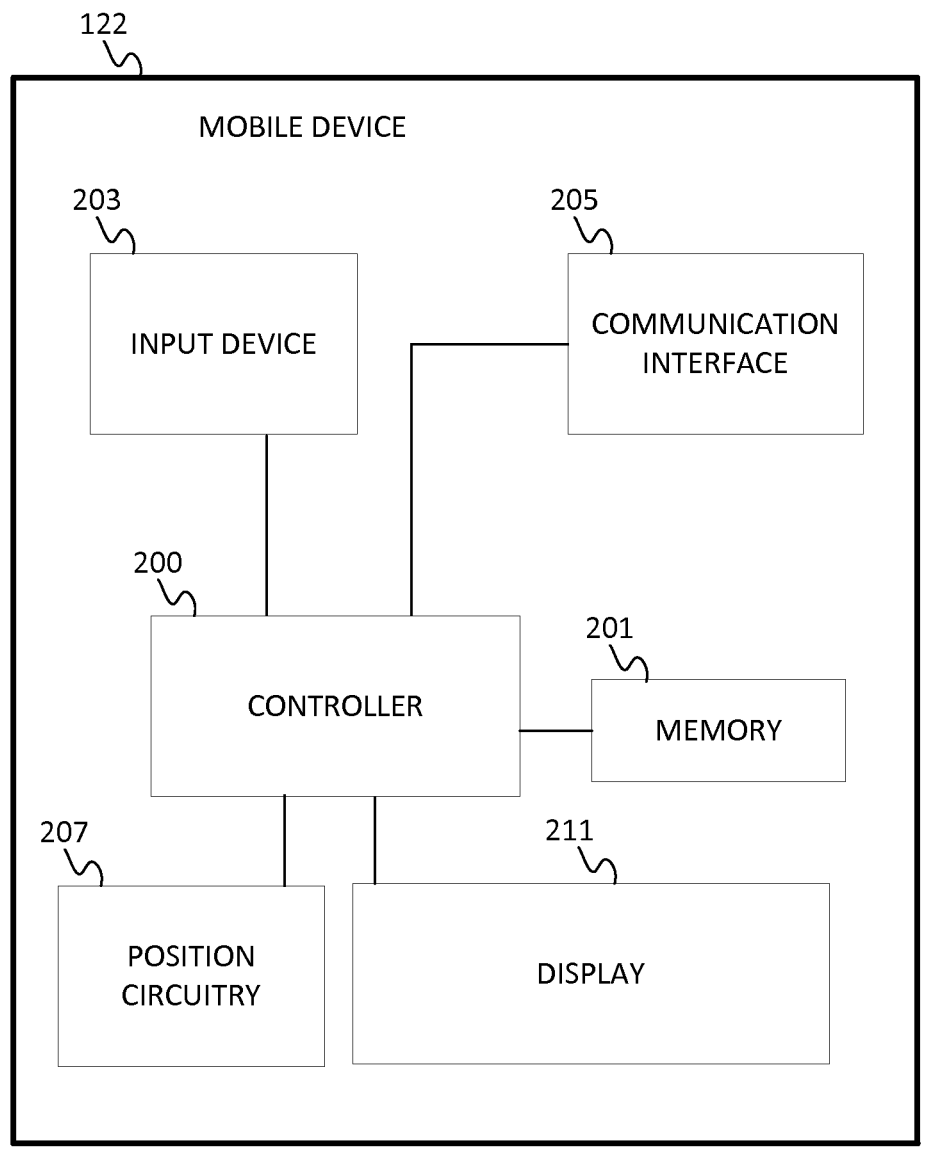
FIG. 9 illustrates an exemplary mobile device of the system of FIG. 1.
Figure 10:
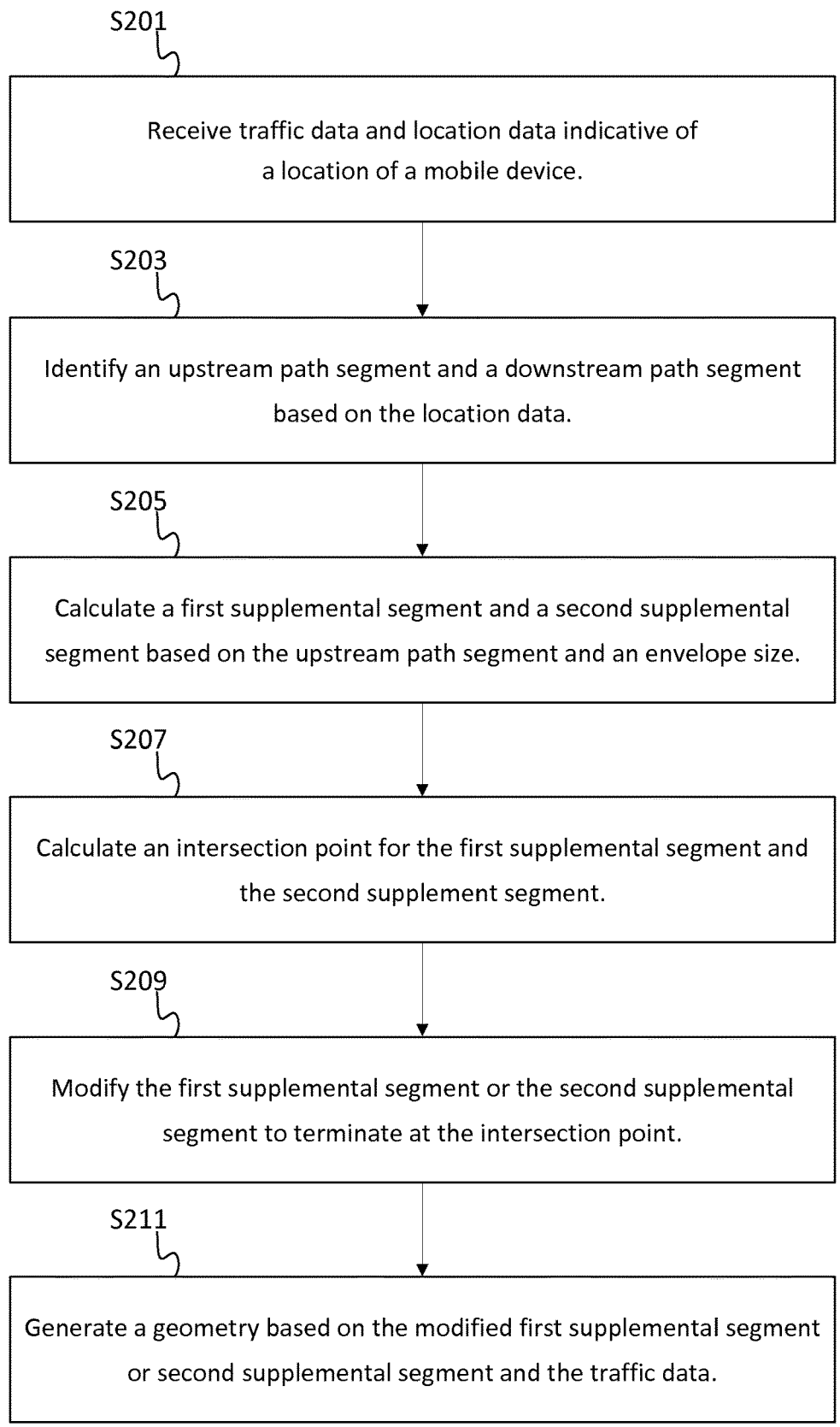
FIG. 10 illustrates another example flowchart for traffic rendering.

FIG. 9 illustrates an exemplary mobile device 122 of the system of FIG. 1. The mobile device 122 may be referred to as a navigation device. The mobile device 122 includes a controller 200, a memory 201, an input device 203, a communication interface 205, position circuitry 207, and a display 211. The workstation 128 may include at least a memory and processor and may be substituted for the mobile device in the following. FIG. 10 illustrates an example flowchart for dynamic traffic rendering. The acts of FIG. 10 may be performed by the mobile device 122 or another device. Additional, different, or fewer acts may be provided.

At act S201, the controller 200 may receive traffic data and location data indicative of a location of the mobile device 122 from memory 201. The traffic data may be originally received from a traffic service. The location data may be originally derived from position circuitry 207.

At act S203, the controller 200 may identify an upstream path segment and a downstream path segment based on the location data. The upstream path may be the current path segment that the mobile device 122 is traveling on, and the downstream segment may be the next path segment if the mobile device 122 continues to travel on the current route. The controller 200 may identify multiple subsequent downstream paths (e.g., when there is a fork in the upstream path or a traffic intersection at the terminal end of the upstream segment).

At act S205, the controller 200 may calculate a supplemental segment based on the upstream path segment and another supplemental segment based on the downstream path. The supplemental paths may be lines parallel to the upstream and downstream paths. The supplemental paths may be spaced apart from the upstream and downstream paths by an envelope distance.

The envelope distance may be defined according to the type of paths associated with the upstream and downstream path segments. The envelope sizes may be the same or different. The envelope size may be a function of classification of the paths, the number of lanes of the paths, or a combination of both.

At act S207, the controller 200 calculates an intersection point for the first supplemental segment and the second supplement segment. The intersection point may be calculated geometrically, algebraically, or through trial and error. At S209, the controller 200 modifies the first supplemental segment or the second supplemental segment to terminate at the intersection point. At S211, the controller 200 generates a shape of geometry based on the modified first supplemental segment or second supplemental segment and the traffic data. The geometry may be two-dimensional and in the shape of a road as shown by map 135. The geometry may include colors, shadings, or other indicia that represents the traffic data received from the traffic service 110.

In addition or the alternative to traffic reporting, the traffic values may be used to provide functions for an autonomous vehicle. An autonomous vehicle is self-driving and may be referred to as a robot vehicle or an automated vehicle. The autonomous vehicle may include passengers but no driver is necessary. The mobile device 122 or another computer system in communication with the mobile device 122 may include instructions for routing the vehicle or operating the vehicle. An estimated travel time may be calculated based on the traffic values and a route may be chosen based on the estimate travel time. The computing system may generate driving commands for steering the vehicle, shifting gears, increasing and decreasing the throttle, and braking. The computing system may generate auxiliary commands for controlling the headlights, turn signals, windshield wipers, defrost, or other auxiliary functions not directly related to the movement of the vehicle.

The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

The database 123 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities. The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include GPS, Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    receiving a traffic message from a traffic message channel, the traffic message including at least one location code for a path;
    parsing, using a processor, the traffic message into a first component and a second component;
    accessing a location code from the first component of the traffic message;
    matching, using the processor, the location code to a geographic location from a map database;
    calculating, using the processor, an envelope size for the location code based on the geographic location;
    constructing, using the processor, a two-dimensional representation of the path from the first component of the traffic message that includes a plurality of straight path segments wherein an end of a first of the plurality of straight path segments is spaced apart from a start of a sequential straight path segment of the plurality of straight path segments; and
    modifying the two-dimensional representation of the path to form a closed shape from the plurality of straight path segments, wherein the closed shape has a width based on the envelope size calculated from the first component of the traffic message.

2. The method of claim 1, wherein the second component includes an offset distance for the path to split the path described by the traffic message into multiple sections.

3. The method of claim 1, wherein the first component describes an internal portion of the path and the second component describes an external portion of the path.

4. The method of claim 3, wherein the external portion of the path includes a ramp or an exit for the path.

5. The method of claim 1, wherein the at least one location code for the path from the traffic message includes a first location code and a second location code, the method comprising:
    calculating a vector based on the first location code and the second location code, wherein the two-dimensional representation of the path from the traffic message is based on the vector.

6. The method of claim 5, further comprising:
calculating a maximum envelope size based on the vector.

7. The method of claim 1, wherein calculating the envelope size for the location code based on the geographic location comprises:
calculating the envelope size in response to whether the geographic location corresponds to a right hand traffic location or a left hand traffic location.

8. The method of claim 1, wherein calculating the envelope size for the location code based on the geographic location comprises:
accessing the map database using the geographic location for a functional classification of the path; and
calculating the envelope size in response to the functional classification.

9. The method of claim 8, wherein the envelope size for a first functional class exceeds the envelope size for a second functional class.

10. The method of claim 1, wherein calculating the envelope size for the location code based on the geographic location comprises:
accessing the map database using the geographic location for a number of lanes for the path; and
calculating the envelope size in response to the number of lanes.

11. An apparatus comprising:
a geographic database configured to store road segments in associated with geographic locations; and
a server configured to:
receive a traffic message from a traffic message channel, the traffic message including at least one location code for a road segment of a path,
parse the traffic message into a first component and a second component and match a location code for the first component to a geographic location from the geographic database,
construct a two-dimensional representation of the road segment that includes a plurality of straight path segments wherein an end of a first of the plurality of straight path segments is spaced apart from a start of a sequential straight path segment of the plurality of straight path segments,
calculate an envelope size from the first component of the traffic message for a width of the two-dimensional representation of the road segment for the geographic location, and
modify the two-dimensional representation of the path to form a closed shape from the plurality of straight path segments, wherein the closed shape has the width based on the envelope size.

12. The apparatus of claim 11, wherein the second component includes an offset distance for the path to split the path described by the traffic message into multiple sections.

13. The apparatus of claim 11, wherein the first component describes an internal portion of the path and the second component describes an external portion of the path.

14. The apparatus of claim 13, wherein the external portion of the path includes a ramp or an exit for the path.

15. The apparatus of claim 11, wherein the envelope size is calculated in response to whether the geographic location corresponds to a right hand traffic location or a left hand traffic location.

16. The apparatus of claim 15, wherein the envelope size is calculated in response to a functional classification of the road segment.

17. The apparatus of claim 16, wherein the envelope size for a first functional class exceeds the envelope size for a second functional class.

18. An apparatus comprising:
at least one processor; and
at least one memory including computer program code for one or more programs, the at least one memory and the computer program code configured to, with the at least one processor, cause the apparatus to at least perform:
receive a traffic message from a traffic message channel, the traffic message including at least one location code for a path;
parse the traffic message into a first component and a second component; access a location code from the first component of the traffic message;
match the location code to a geographic location from a map database;
calculate an envelope size for the location code based on the geographic location;
construct a two-dimensional representation of the path from the first component of the traffic message that includes a plurality of straight path segments wherein an end of a first of the plurality of straight path segments is spaced apart from a start of a sequential straight path segment of the plurality of straight path segments; and
modifying the two-dimensional representation of the path to form a closed shape from the plurality of straight path segments, wherein the closed shape has including a width based on the envelope size calculated from the first component of the traffic message.

19. The apparatus of claim 18, wherein the second component includes an offset distance for the path to split the path described by the traffic message into multiple sections.

20. The apparatus of claim 18, wherein the first component describes an internal portion of the path and the second component describes an external portion of the path.

* * * * *